United States Patent [19]

Sakai et al.

[11] Patent Number: 4,830,521
[45] Date of Patent: May 16, 1989

[54] ELECTRONIC TYPEWRITER WITH A SPELLING CHECK FUNCTION AND PROPER NOUN RECOGNITION

[75] Inventors: Toshiyuki Sakai; Ryoichi Sasaki, both of Nagoya; Hajime Kumazawa, Ichinomiya, all of Japan

[73] Assignee: Brother Kogyo Kabushiki Kaisha, Aichi, Japan

[21] Appl. No.: 116,492

[22] Filed: Nov. 4, 1987

[30] Foreign Application Priority Data

Nov. 10, 1986 [JP] Japan .............................. 61-267157

[51] Int. Cl.⁴ ................................................ B41J 5/30
[52] U.S. Cl. ...................................... 400/63; 400/83; 364/419; 364/900
[58] Field of Search .................. 400/63, 70, 74, 83; 364/200, 300, 419, 900

[56] References Cited

U.S. PATENT DOCUMENTS

| | | | |
|---|---|---|---|
| 4,358,824 | 11/1982 | Glickman et al. | 364/200 |
| 4,507,750 | 3/1985 | Frantz et al. | 364/419 X |
| 4,590,560 | 5/1986 | Sado | 400/83 X |
| 4,641,264 | 2/1987 | Nitta et al. | 364/419 X |
| 4,655,620 | 4/1987 | Adams et al. | 400/83 X |
| 4,671,684 | 6/1987 | Kojima et al. | 400/63 |
| 4,674,065 | 6/1987 | Lange et al. | 400/63 X |
| 4,701,851 | 10/1987 | Bass et al. | 400/63 X |

OTHER PUBLICATIONS

IBM Technical Disclosure Bulletin, "Method for Capitalization Checking During Spelling Verification", Hamilton et al, vol. 22, No. 12, May 1980, p. 5240.
IBM Technical Disclosure Bulletin, "Writeable Adaptive Transient Dictionary", Glickman et al, vol. 25, No. 2, Jul. 1982, pp. 501-502.
IBM Technical Disclosure Bulletin, "Method for Detecting and Correcting Selected Word Spelling Errors in a Text Processing System", Barker et al, vol. 25, No. 8, Jan. 1983, p. 4225.
IBM Technical Disclosure Bulletin, "Text Compression Using Spelling Dictionary", Parrott, vol. 25, No. 11B, Apr. 1983, pp. 6249-6250.
IBM Technical Disclosure Bulletin, "User-Specified Spelling Supplement Support", vol. 28, No. 8, Jan. 1986, pp. 3324-3325.
IBM Technical Disclosure Bulletin, "Method to Skip a Word During Spell Check", vol. 29, No. 7, Dec. 1986, pp. 3114-3115.

Primary Examiner—Ernest T. Wright, Jr.
Attorney, Agent, or Firm—Oliff & Berridge

[57] ABSTRACT

An electronic typewriter or a word processor with a spelling check function for speedier typing comprises a keyboard, a dictionary memory, a spelling checker, alarm means for issuing an alarm when the input word is determined to be incorrectly spelled, proper noun determination means for determining whether the input word is a proper noun and skip means for not activating the alarm means when the input word is determined to be a proper noun. The input word is determined to be a proper noun when the first letter is an upper case letter and the input word is not a first word in a sentence, or when the input word is composed of upper case letters and the preceding words are not composed of upper case letters.

8 Claims, 5 Drawing Sheets

ELECTRONIC TYPEWRITER WITH A SPELLING CHECK FUNCTION AND PROPER NOUN RECOGNITION

BACKGROUND OF THE INVENTION

1. Field of the Invention

This invention relates to a word processor with a spelling check function, especially one for avoiding an unnecessary alarm caused during spelling checking of a proper noun.

2. Prior Art

Recent work processors and electronic typewriters are provided with a spelling check function which can check the spelling of an input word. Those work processors or typewriters include a dictionary memory storing many correctly spelled words. When a word is input from a keyboard, the spelling of the input word is automatically checked by comparing it with all words in the dictionary memory.

In case of an electronic typewriter or incase of a typewriter mode of a work processor in which each input character is printed on a paper individually, when a word partition key, such as a space key, comma key, period key, carriage return key, etc., is operated, the preceding group of characters are considered a word and spelling checking automatically begins for the word. When the word is judged to be mis-spelled, an alarm is issued to the operator.

Generally, such word processors or typewriters have a user dictionary for mainly storing proper nouns. In the user dictionary, in many cases, personal names, company names, place names, etc. that frequently appear in documents are entered (or registered) in the dictionary by the operator to make the spelling checking operation smoother and speedier. In the spelling checking process, the input word is compared not only with words in the standard dictionary provided but also with words in the user dictionary to check whether the word is mis-spelled. The words in the user dictionary are first entered usually during the course of spelling checking operation when the input word is judged mis-spelled.

But the above prior art word processors or typewriters have a shortcoming. Frequently appearing proper nouns are stored in the user dictionary by the operator and are not judged to be mis-spelled because they are passed by the spelling checker. But a rarely appearing proper noun word cannot be entered in the user dictionary before it appears in a document. When there are many such rare proper nouns in a document, the inputting operation is frequently interrupted by an alarm from the spelling checker. This interferes with quick typing. Entering the rare proper nouns in the dictionary does not solve the problem because such registration takes time and each of the many words appears only once in one typing job.

SUMMARY OF THE INVENTION

An object of the invention is to speed up the typing of a document which includes many rare proper nouns.

Another object is to adequately avoid alarm or interruption of the typing operation by the spelling checking of a proper noun word to allow faster typing.

These and other objects are achieved by the present invention having a construction set forth and shown in FIG. 1. According to the invention, the electronic typewriter with a spelling check function comprises: a keyboard M1 for inputting a word; a dictionary memory M2 which stores spelling information of a plurality of words; spelling check means M3 for determining whether an input word is correctly spelled as based on the spelling information of the dictionary memory M2; alarm means M4 for issuing an alarm when the input word is judged to be incorrectly spelled; proper noun determination means M5 for judging whether the input word is a proper noun; skip means M6 for stopping the alarm means M4 from issuing an alarm when the input word is determined to be a proper noun.

BRIEF EXPLANATION OF THE DRAWINGS

The invention may be best understood by referring to the following description of the preferred embodiment and the drawings in which.

DETAILED DESCRIPTION OF A PREFERRED EMBODIMENT

Figure 1:
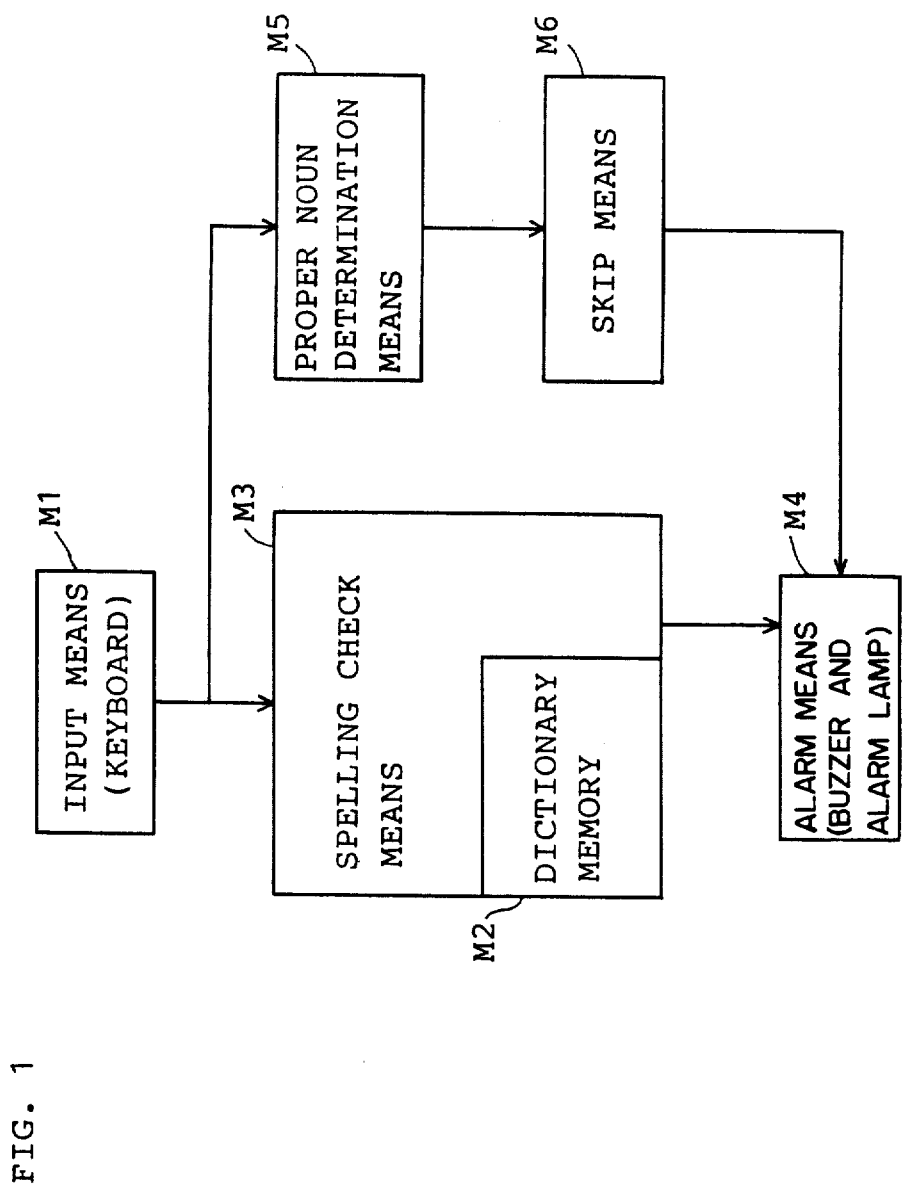
FIG. 1 is a schematic block diagram showing the basic structure of the invention.

Hereinafter, a first embodiment of the present invention will be described referring to the drawings. This embodiment is an electronic typewriter 1 with a spelling check function and the spelling check function is designed to avoid the misspelling judgement and alarming against proper nouns.

Figure 2:
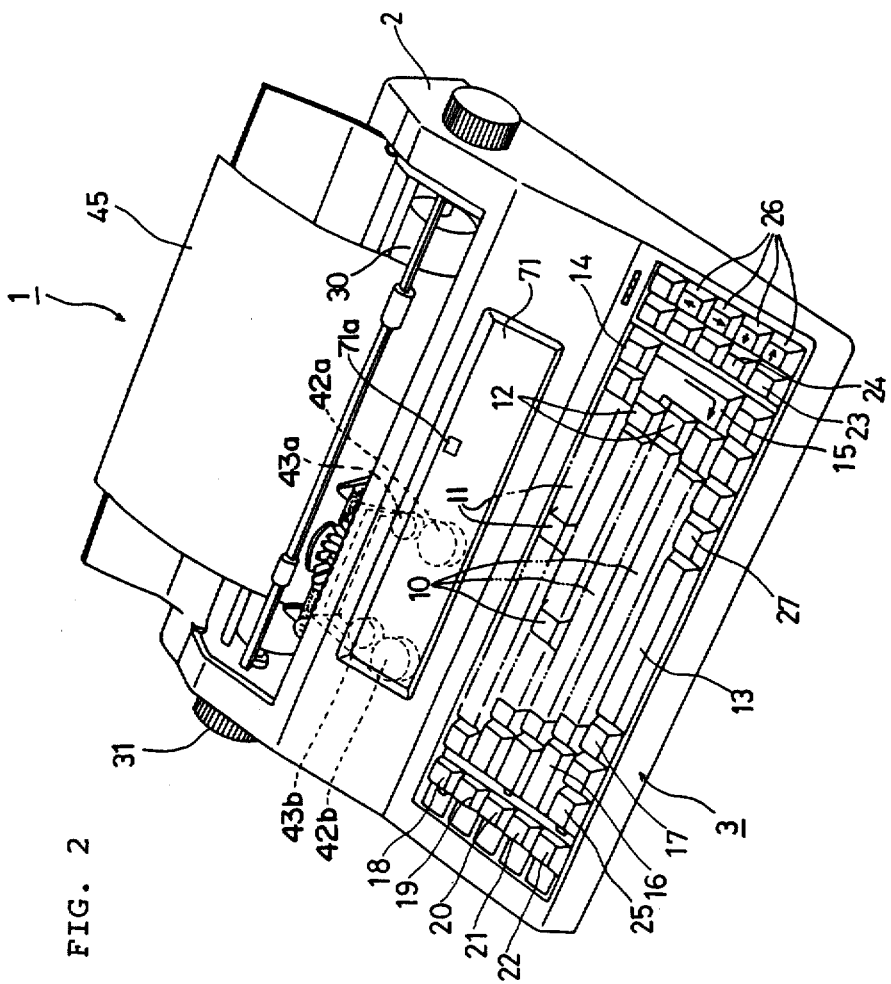
FIG. 2 is a perspective view of an electronic typewriter in a preferred embodiment of the invention.

As shown in FIG. 2, a keyboard 3 is provided on the front part of a body frame 2 of an electronic typewriter 1. A print mechanism PM is installed behind the keyboard 3 and within the body frame 2.

The keyboard 3 comprises various keys as follows: character keys including alphabet keys 10, numeral keys 11 and symbol keys 12; a space key 13; a back space key 14; a return key 15; a shift key 16; a code key 17; a left margin set key 18; a right margin set key 19; a tab set key 20; a tab clear key 21; a tab key 22; a paper-up key 23; a paper-down key 24; a repeat key 25; a cursor movement key 26 for moving a cursor 71a on a LCD display 71; and a correction key 27. The functions of the above-mentioned keys and other keys are similar to those of familiar typewriters.

In the upper side of the keyboard 3, the liquid crystal display (LCD) 71 for displaying characters input by means of the above-mentioned keys 10, 11, 12 and 13 is installed.

Figure 3:
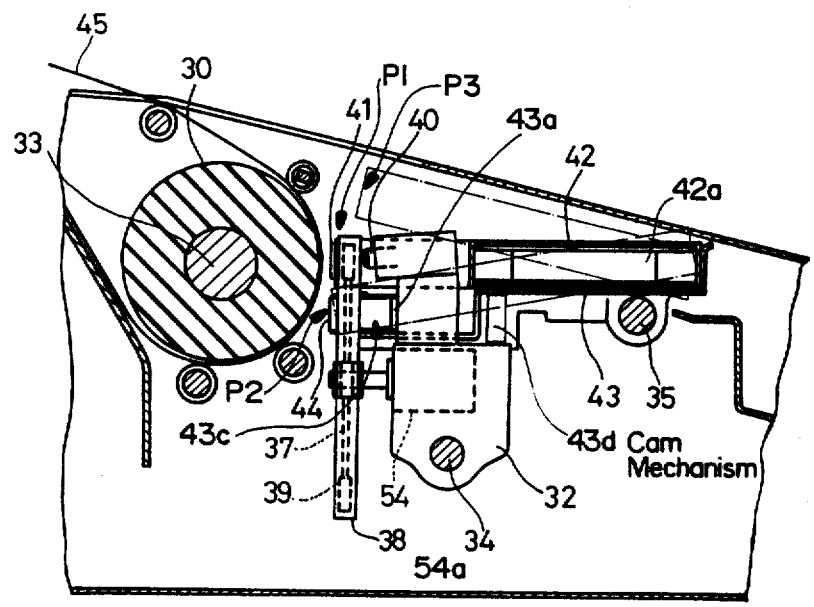
FIG. 3 is a sectional view of the typewriter.

In the print mechanism PM, a platen 30 is provided laterally across the body frame 2. The platen 30 is driven by a platen drive motor 50 or manually by a platen knob 31 to feed a paper 45. As shown in FIG. 3, a carriage 32 is supported by two guide shafts 34 and 35 which are provided parallel to a platen shaft 33 so that the carriage 32 moves along the platen 30. The carriage 32 is equipped with a type wheel motor 54 for driving a type wheel 37. The type wheel 37 is included in a wheel cassette 38 and is removable attached to the shaft 54a of the wheel motor 54. One of type 39 of the type wheel 37 is set at a print position P1 opposite a print hammer 40. The print hammer 40 is located at the top of the carriage 32, and strikes the type 39 in the print position P1 to print it on the paper 45. A ribbon cassette 42 containing a print ribbon 41 is set on a holder 43. The front end of the holder 43 is attached to the guide shaft 35 to be rotatable with respect to the carriage 32. The print ribbon 41 is fed from a feed spool, 42a of the ribbon cassette 42 and is taken up by a take-up spool 42b which is driven by a ribbon feed motor 52. In a cavity 43c at the rear part of the holder 43, a correction ribbon 44 having a feed spool 43a and a take-up spool 43f is installed.

To reposition the holder 43 between the print position P1, a pause position P2 and a correction position P3, a cam mechanism 43d (shown schematically) is provided on the carriage 32. A position into which the print ribbon 41 is inserted between the selected type 39 and the platen 30 (ref: FIG. 3) is called the print position P1. A position to which the print ribbon 41 is returned from the print position P1 is called the pause position P2. The correction position designates a position into which the correction ribbon 44 is inserted between the selected type 39 and the platen 30. A correction ribbon drive mechanism DM4 is provided on the carriage 32. The correction ribbon 44 is fed by a preset length from the feed spool 43a to the take-up spool 43b when the holder 43 is moved into the correction position P3.

Namely, the print mechanism PM includes: the platen 30 and a platen drive mechanism DM1 the carriage 32 and a carriage drive mechanism DM2; the type wheel 37 and a type wheel drive mechanism DM5; the print ribbon 41 and the a ribbon feed mechanism DM3; the cam mechanism 43s (shown schematically) for moving both the print ribbon 41 and the correction ribbon 44 into the print position P1. and the correction ribbon drive mechanism DM4; and the print hammer 40 and A hammer drive mechanism DM6. Every drive mechanism DM1-DM6 is connected to the control section C.

Figure 4:
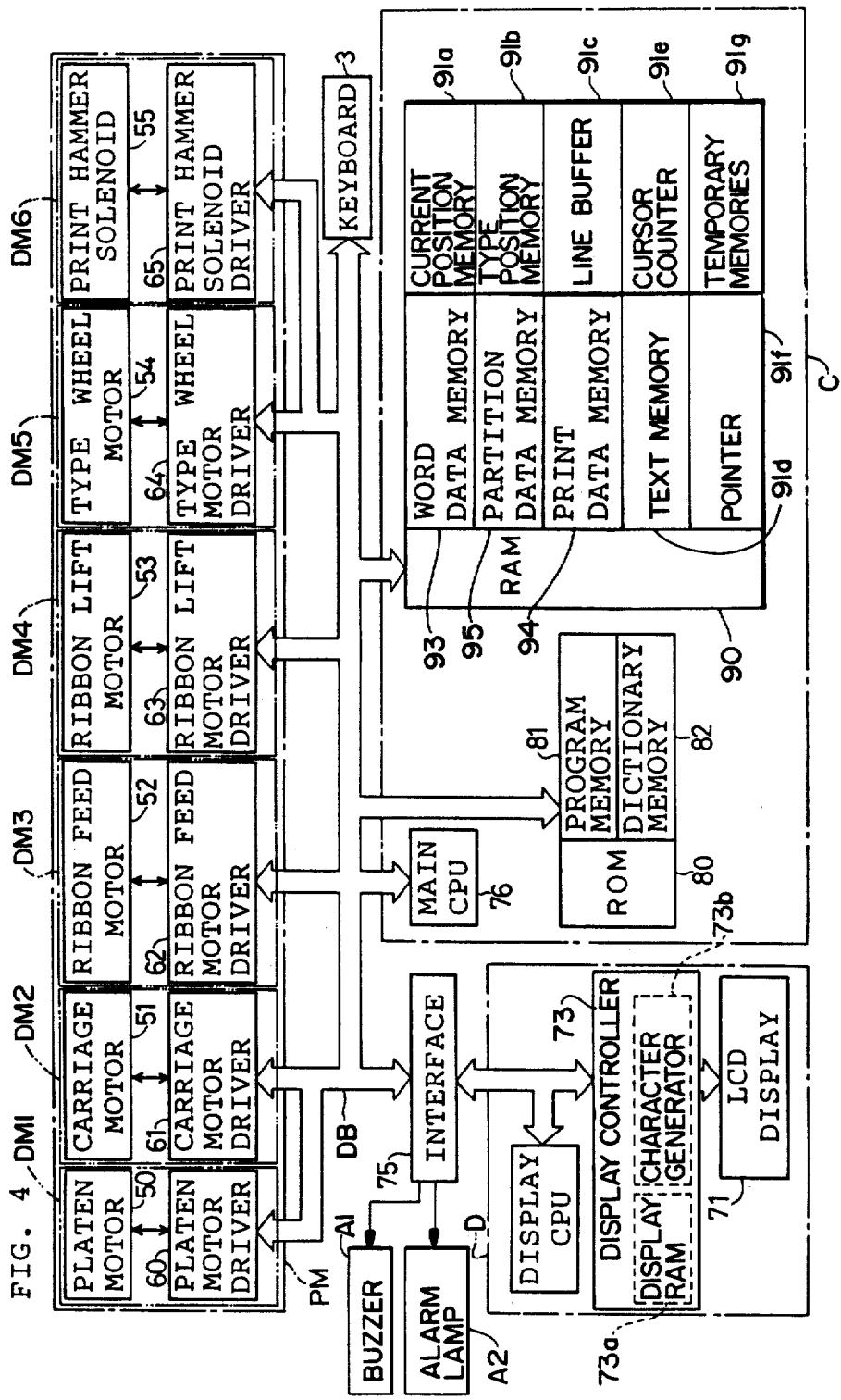
FIG. 4 is an electric block diagram of the typewriter.

The control system of the electronic typewriter 1 is hereinunder described with reference to FIG. 4.

The driver section of the print mechanism PM consists of a platen motor 50, a platen motor driver 60, a carriage motor 51, a carriage motor driver 61, a ribbon feed motor 52, a ribbon feed motor driver 62, a ribbon lift motor 53, a ribbon lift motor driver 63, a type wheel motor 54, a type wheel motor drdiver 64, a print hammer solenoid 55, and a print hammer solenoid driver 65. Each driver 60, 65 of the print mechanism PM is connected to the control section C.

A display section D includes a display CPU 70, the LCD display 71 for displaying 20×2 characters, and a display controller 73 for controlling the LCD display 71. The controller 73 has a display RAM 73a and a character generator 73b including dot pattern information for each character. The display CPU 70 receives command data and character data output from a main CPU 76 via an interface 75. Then, the display CPU 70 forms display data according to the character generator 73b, and outputs the data to the display controller 73. The display controller 73 outputs a display signal, responsive to the display data, to the LCD display 71.

The control section C consists of the main CPU 76, and ROM 80 and RAM 90 which are connected with the CPU 76. Moreover, the keyboard 3, the drivers 60 through 65 in the print mechanism PM, and the interface 75 are all connected to the main CPU 76 by means of a data bus DB.

A program memory 81 of the ROM 80 stores many control programs including one for controlling motors 50 through 54, the print hammer solenoid 55, and the display section D in response to various code data input from the character keys 10, 11, 12, space key 13, and other function keys of the keyboard 3. The program memory 81 also stores a spelling check program, a correct word suggestion program, a character erasing program and so on. The spelling check program will be described later. The correct word suggestion program searchers for one or more suggestion words from a dictionary memory 82 when the input word is judged mis-spelled by the spelling check program. Each suggestion word is composed of the same letters with the mis-spelled word except one, which is replaced with a likely different letter.

The dictionary memory 82 is provided in the ROM 80 and contains spelling information of, for example, 70,000 words in alphabetical order for use in the spelling check program.

The RAM 90 includes memory regions as follows: a current position memory A1a for storing the current position of the carriage 32; a type position memory A1 for storing the current position of a type wheel 37; a word data memory 93 for storing the lastly input word for use in the spelling check program; a print data memory 94 for storing the printed characters in accordance with the printing order when the typewriter 1 is used in a normal typewriter mode or in a line by line print mode; a partition data memory 95 for storing word partition code data such as a space, a period, a comma, a colon, a semi-colon, a carriage return, etc. for the definition of a word; a line buffer A1c for storing one or two lines of input chargers (in order to display them on the LCD display 71); a text memory A1d for storing the input text in an electronic file; a cursor counter A1c and a pointer A1f for controlling the position of the cursor 71a on the LCD display 71; and other miscellaneous temporary memories A1g.

In the typewriter mode, the main CPU 76 works as follows. Responsive to a character code input from the keyboard 3, the CPU 76 controls the print mechanism PM to print the character on the paper 45. The CPU 76 stores the printed character in the print data memory A4 in the RAM 90 in accordance with the print position. Then the CPU 76 stores the current positions of the carriage motor 51 an the type wheel motor 54 in the current position memory A1a and in the type position memory A1b in the RAM 90.

In a memory mode, in which input data is not printed out on the paper 45 but stored in the text memory A1d, the main CPU 76, responsive to a character code data input from the keyboard 3, stores the character code data in the line buffer A1c and in the text memory A1d in the RAM 90. At the same time, the CPU 76 outputs the character code data to the CPU 70 of the display section D, which displays the character on the display 71 and controls the cursor position on the display 71.

When the operated key is a function key for driving the motors 50 through 54 and the solenoid 55 of the print mechanism PM, the input function code data is processed by the control program in the CPU 76, and necessary signals are output to drivers 60 through 65.

For erasing a printed character in response to the correction key 27 in the typewriter mode, the CPU 76 reads the character erasing program from the program memory 81 of the ROM 80 and works according to the program. First the CPU 76 outputs a signal to the ribbon lift motor driver 63 to drive the ribbon lift motor 53 moving the holder 43 to the correction position P3. Then the CPU 76 reads out the character data from the print data memory 94 corresponding to the current carriage position specified in the current position memory A1a in the RAM 90. The CPU 76 outputs a signal to the type wheel motor driver 64 to drive the type wheel motor 54 to place the corresponding type 39 of the type wheel 37 at the print position P1. Then the CPU 76 outputs a signal to the hammer solenoid driver 65 to drive the hammer solenoid 55 to hit the type 39 by the print hammer 40 in order to erase the desired character via the correction ribbon 44. In this case, when the erased character is one of the currently inputting word, the data corresponding to the erased character is removed from the print data memory 94.

In a spelling check mode, in which the spelling of every input word is checked, the main CPU 76 reads the spelling check program from the program memory 81 responsive to word partition code data (explained later). The CPU 76 searches in the dictionary memory 82 for the same word as that stored in the word data memory 93. When the same word is not found in the dictionary memory 82, the input word in the word data memory 93 is assumed mis-spelled an the CPU 76 issues an alarm, e.g. beeps a buzzer A1, and starts the correct word suggestion program. By the correct word suggestion program, one or more of suggestion words are displayed on the LCD display 71 by the above mentioned process.

Figure 5:
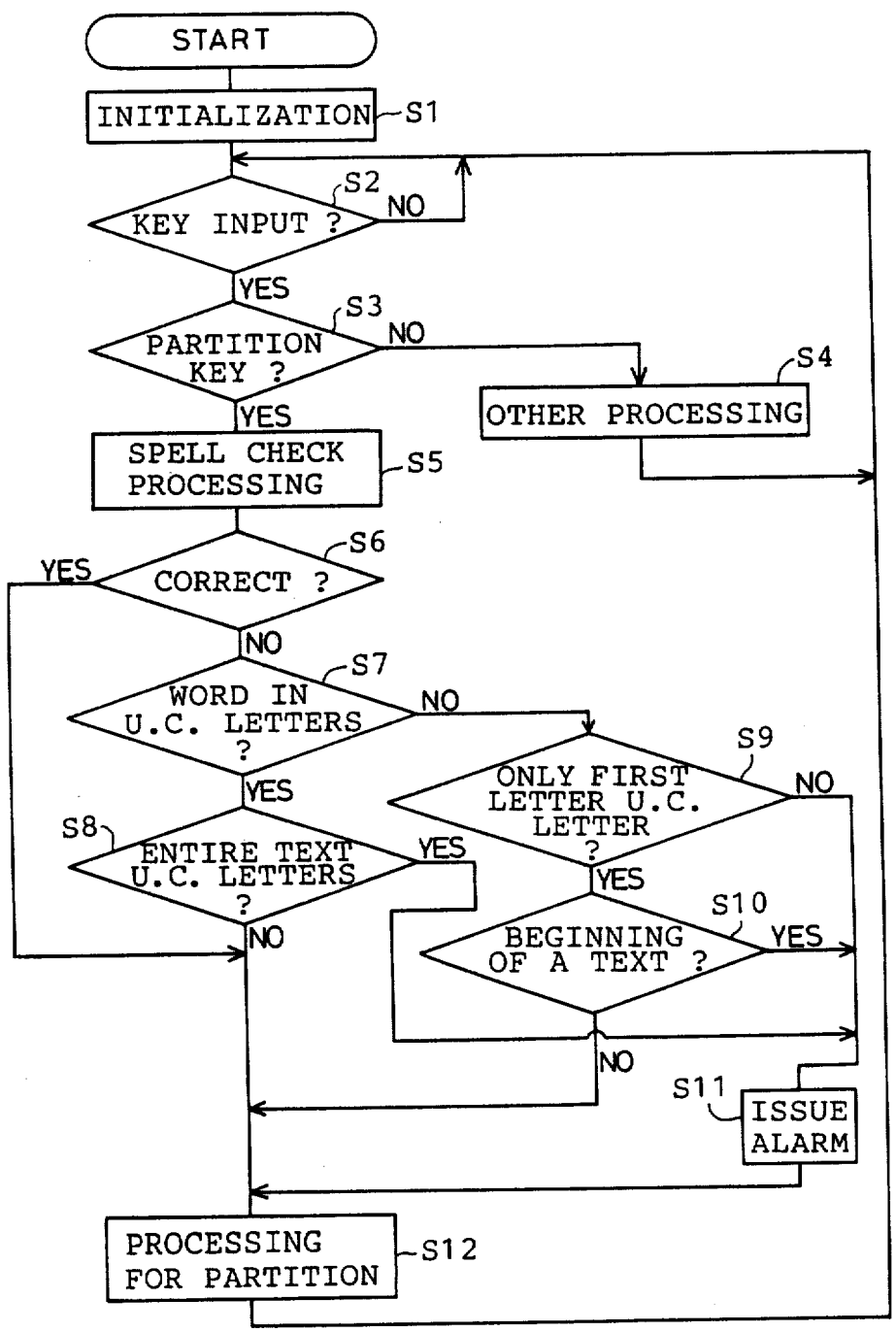
FIG. 5 is a flowchart of the spelling check processing executed by the control section of the typewriter.

The spelling check processing executed in the control section C is explained according to a flowchart of FIG. 5. when the typewriter 1 is turned on, this control program is started. First at step S1, various initialization processings are executed. After the initialization, at step S2, it is determined whether any key is operated. When no key is operated, this step s2 is repeated until any key is operated, when the processing goes to step S3. At step S3, it is determined whether the code data input by the key operation is one of the word partition codes such as: a space, a carriage return, a period, a comma, a colon, a semi-colon, etc. These word partition codes are stored in the partition data memory 95 of the RAM 90. When the input code data is one of the word partition code data, the processing goes to step S5 for spelling checking and otherwise to step S4 for the other processings.

At step S4, processings according to character keys 10, 11, 12 or to various function keys is executed. When a character key is operated, the corresponding character is printed on the paper 45 and the code data of the character is stored in the word data memory 93 and in the print data memory 94. Until the word partition key is operated, the processings of steps S2, S3 and S4 are repeated.

When a word partition key is operated, spelling check processing is executed at step S5, in which the data in the word data memory 93 is compared with every word data stored in the dictionary memory 82. After the comparison, it is determined at step S6 whether the input word is correctly spelled, i.e., whether there is an identical word in the dictionary memory 82. When the input word is judged correctly spelled, the processing goes to step S12 and otherwise to step S7.

Steps S7 to S10 are processing for determined whether the input word is a proper noun. First at steps S7, it is determined whether all the letters composing the input word are upper case letters based on the code data in the word data memory 93. when the answer is YES at step S7, the processing goes to step S8 and otherwise to step S9. When the input word is composed of upper case letters only, it is then determined at step S8 whether the entire text is in upper case letters. The code data of every letter in the text is checked in the print data memory 94 toward the beginning of the text. When the entire text is determined to be in upper case letters at step S8, the input word is not assumed to be a proper noun and the processing goes to step S11. When the whole text is not in upper case letters, it is assumed that the input word which is in upper case letters is a proper noun and the processing goes to step S12.

At step S9, it is determined whether the first letter of the input word is an upper case letter by checking each letter composing the input word stored in the word data memory 93. If the answer is YES, the input word may be a proper noun and the processing goes to step S10 but otherwise goes to step S11.

It is then determined at step S10 whether the input word is the fist word of a sentence. When the input word data is stored at the beginning of the print data memory 94, or when a period "." code data exists between the input word data and the preceding word data in the print data memory 94, the input word is determined to be the first word of a sentence. When the answer is YES at step S10, the input word is not assumed to be a proper noun and the processing goes to step S11 and otherwise goes to step S12. Namely, as a whole, when the input word is not assumed to be a proper noun through the determinations of step S7 to step S10, the processing goes to step S11; and when the input word is assumed to be a proper noun, it goes store step S12.

At step S11, where the input word is judged mis-spelled at step S5 and is assumed not to be a proper noun by the processings of step S7 through step S10, an alarm is issued, e.g., an alarm message is displayed on the LCD display 71. The buzzer A1 is beeped or an alarm lamp A2 is lighted. After the alarm processing, processing according to the work partition key as described above is executed at step S12 and the processing returns to step S2 to repeat the above processings for the next key input.

When an alarm is issued at step S11, one or more correct words picked from the dictionary memory 82 with respect to the doubted input word are suggested by the control section C on the display 71. Further the typewriter 1 has a special correction function by which the mis-spelled input word printed on the paper 45 is erased by the correction ribbon 44 when the operator hits a correction key 27 on the keyboard 3 responsive to the alarm. It is further possible to print one of the suggested correct words in place of the erased incorrect word responsive to the operators selection.

As described, according to the invetion, the operator can type a text at high speed because proper nouns which are usually not in the dictionary memory 82 do not elicit an alarm.

Obviously numerous modifications and variations of the present invention are possible in light of the above teachings. For example, while the determination of a proper noun is executed after the spelling of the input word is checked in the above embodiment, the spelling checking may be executed after the input word is determined not to be a proper noun. The above embodiment is explained for a daisy wheel typewriter, but a typewriter with a thermal printer or a type ball printer may employ the invention. Further this invention can be applied in a word processor with a spelling check function. It is therefore to be understood that within the scope of the claims, the invention may be practiced otherwise than as specifically described therein.

What is claimed is:

1. An electric typewriter with a spelling check function comprising:
    a keyboard for inputting a word;
    a dictionary memory which stores spelling information of a plurality of words;
    spelling check means for determining whether an input word is correctly spelled as based on the spelling information of the dictionary memory;
    alarm means for issuing an alarm when the input word is determined to be incorrectly spelled;
    proper noun determination means for determining whether the input word is a proper noun by checking capitalization of the input word; and
    skip means for not activating the alarm means when the input word is determined to be a proper noun.

2. The electronic typewriter according to claim 1 wherein the proper noun determination means determines that an input word is a proper noun when only the first letter of the input word is an upper case letter and the input word is not the first word of a sentence.

3. The electronic typewriter according to claim 1 wherein the proper noun determination means determines that an input word is a proper noun when every letter composing the input word is an upper case letter and any letters in another input word preceding the input word are not in upper case letters.

4. The electronic typewriter according to claim 1, wherein the proper noun determination means determines whether the input word is a proper noun when the spelling information of the input word is not in the dictionary memory.

5. A word processor with a spelling check function comprising:
    input means for inputting a word;
    a dictionary memory which stores spelling information of a plurality of words;
    spelling check means for determining whether an input word is correctly spelled based on the spelling information of the dictionary memory;
    alarm means for issuing an alarm when the input word is determined to be incorrectly spelled;
    proper noun determination means for determining whether the input word is a proper noun by checking capitalization of the input word; and
    skip mean for not activating the alarm means when the input word is determined to be a proper noun.

6. The word processor according to claim 5 wherein the proper noun determination means determines that an input word is a proper noun when only the first letter of the input word is an upper case letter and the input word is not the first word of a sentence.

7. The word processor according to claim 5 wherein the proper noun determination means determines that an input word is a proper noun when every letter composing the input word is an upper case letter and any letters in another input word preceding the input word are not in upper case letters.

8. The word processor according to claim 5, wherein the proper noun determination means determines whether the input word is a proper noun when the spelling information of the input word is not in the dictionary memory.

* * * * *